(12) United States Patent
Yokoyama et al.

(10) Patent No.: US 11,709,550 B2
(45) Date of Patent: Jul. 25, 2023

(54) INFORMATION PROCESSING APPARATUS, METHOD FOR PROCESSING INFORMATION, AND PROGRAM

(71) Applicant: SONY CORPORATION, Tokyo (JP)

(72) Inventors: Ryo Yokoyama, Tokyo (JP); Takeshi Ogita, Kanagawa (JP); Yohei Fukuma, Chiba (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/053,861

(22) PCT Filed: Jun. 11, 2019

(86) PCT No.: PCT/JP2019/023115
§ 371 (c)(1),
(2) Date: Nov. 9, 2020

(87) PCT Pub. No.: WO2019/244716
PCT Pub. Date: Dec. 26, 2019

(65) Prior Publication Data
US 2021/0132695 A1    May 6, 2021

(30) Foreign Application Priority Data

Jun. 19, 2018   (JP) .................................. 2018-116258

(51) Int. Cl.
*G05B 15/02*     (2006.01)
*G06F 3/01*      (2006.01)

(52) U.S. Cl.
CPC ............. *G06F 3/016* (2013.01); *G05B 15/02* (2013.01); *G06F 3/011* (2013.01)

(58) Field of Classification Search
CPC .......... G06F 3/016; G06F 3/011; G05B 15/02
See application file for complete search history.

(56) References Cited

U.S. PATENT DOCUMENTS

| 6,088,011 A | * | 7/2000 | Lee .................... H01J 17/497 |
| | | | 345/694 |
| 6,223,018 B1 | * | 4/2001 | Fukumoto ............ H04B 13/005 |
| | | | 379/55.1 |

(Continued)

FOREIGN PATENT DOCUMENTS

| CN | 105426024 B | * | 3/2018 |
| JP | 2014-209329 A | | 11/2014 |

(Continued)

OTHER PUBLICATIONS

Jonggi Hong et al, "Evaluating Wrist-Based Haptic Feedback for Non-Visual Target Finding and Path Tracing on a 2D Surface", published in or at ASSETS'17, Oct. 29-Nov. 1, 2017, Baltimore, MD, USA, available at https://doi.org/10.1145/3132525.3132538, retrieved Sep. 27, 2021 (Year: 2017).*

(Continued)

*Primary Examiner* — Shourjo Dasgupta
(74) *Attorney, Agent, or Firm* — Paratus Law Group, PLLC

(57) ABSTRACT

Provided are an information processing apparatus, a method for processing information, and a program capable of adjusting a perceptual position of a tactile stimulus even with one tactile stimulus unit. The information processing apparatus (20) includes an output control unit (120) that performs output control of a vibration on at least one tactile stimulus unit (130), in which the output control unit changes a frequency of the vibration to be output from the tactile stimulus unit depending on a position of the tactile stimulus unit and predetermined positional information.

13 Claims, 11 Drawing Sheets

(56) References Cited

U.S. PATENT DOCUMENTS

| | | | | |
|---|---|---|---|---|
| 9,122,330 | B2* | 9/2015 | Bau | G06F 3/0488 |
| 9,501,145 | B2* | 11/2016 | Poupyrev | G06F 3/016 |
| 9,513,708 | B2* | 12/2016 | Haga | G06F 3/016 |
| 9,882,560 | B2* | 1/2018 | Ueno | H03K 17/96 |
| 9,971,406 | B2* | 5/2018 | Bombacino | G06F 3/0482 |
| 10,444,837 | B2* | 10/2019 | Takeda | G06F 3/016 |
| 10,551,925 | B2* | 2/2020 | Hwang | G01N 29/346 |
| 11,422,628 | B2* | 8/2022 | Keller | G06F 3/017 |
| 2003/0026170 | A1* | 2/2003 | Yang | G04C 3/005 368/10 |
| 2004/0032346 | A1* | 2/2004 | Kim | G06F 3/014 341/20 |
| 2008/0296072 | A1* | 12/2008 | Takashima | G06F 3/016 178/18.01 |
| 2009/0048539 | A1* | 2/2009 | Lundborg | A61F 2/70 600/595 |
| 2009/0167704 | A1* | 7/2009 | Terlizzi | G06F 3/016 345/173 |
| 2010/0156822 | A1* | 6/2010 | Lee | G06F 3/041 340/407.1 |
| 2011/0248962 | A1* | 10/2011 | Poupyrev | G06F 3/016 345/173 |
| 2012/0038582 | A1* | 2/2012 | Grant | G06F 3/041 345/173 |
| 2013/0229384 | A1* | 9/2013 | Adachi | G06F 3/041 345/174 |
| 2013/0265268 | A1* | 10/2013 | Okumura | G06F 3/04847 345/173 |
| 2013/0285910 | A1* | 10/2013 | Adachi | G06F 3/016 345/173 |
| 2014/0071071 | A1* | 3/2014 | Hirose | G06F 3/016 345/173 |
| 2014/0210781 | A1* | 7/2014 | Stern | G06F 3/045 345/174 |
| 2014/0267065 | A1* | 9/2014 | Levesque | G06F 3/0488 345/173 |
| 2014/0267076 | A1* | 9/2014 | Birnbaum | H01H 13/84 345/173 |
| 2015/0138387 | A1* | 5/2015 | Kokubu | G06F 3/016 348/222.1 |
| 2016/0004309 | A1* | 1/2016 | Modarres | G06F 3/016 345/173 |
| 2016/0077624 | A1* | 3/2016 | Zhao | H04L 45/245 345/174 |
| 2016/0088380 | A1* | 3/2016 | Stauber | H04R 3/04 381/103 |
| 2016/0187974 | A1* | 6/2016 | Mallinson | G06F 1/163 463/32 |
| 2016/0246374 | A1* | 8/2016 | Carter | G08B 6/00 |
| 2016/0246375 | A1* | 8/2016 | Rihn | G06F 3/0483 |
| 2016/0328019 | A1* | 11/2016 | Taninaka | G06F 3/04847 |
| 2016/0328985 | A1* | 11/2016 | Endo | G06F 3/0412 |
| 2016/0342213 | A1* | 11/2016 | Endo | H04B 7/26 |
| 2016/0342269 | A1* | 11/2016 | Endo | G06F 3/0412 |
| 2017/0038841 | A1* | 2/2017 | Takeda | G06F 3/041 |
| 2017/0060244 | A1* | 3/2017 | Khoshkava | G08B 6/00 |
| 2017/0097682 | A1* | 4/2017 | Endo | G06F 3/0484 |
| 2017/0220111 | A1* | 8/2017 | Nakamura | G06F 3/0416 |
| 2017/0220112 | A1* | 8/2017 | Nakamura | B06B 1/0611 |
| 2017/0344118 | A1* | 11/2017 | Yamazaki | F03G 7/065 |
| 2017/0348117 | A1* | 12/2017 | Strbac | A61F 2/72 |
| 2018/0052564 | A1* | 2/2018 | Koseki | G06F 3/0412 |
| 2018/0181203 | A1* | 6/2018 | Subramanian | G01C 21/3652 |
| 2019/0050073 | A1* | 2/2019 | Murakami | B60R 16/03 |

FOREIGN PATENT DOCUMENTS

| | | |
|---|---|---|
| JP | 2018-064264 A | 4/2018 |
| WO | WO 2016/038953 A1 | 3/2016 |
| WO | WO 2017/043610 A1 | 3/2017 |
| WO | WO 2018/008217 A1 | 1/2018 |

OTHER PUBLICATIONS

Edouard Gentaz et al, "The Haptic Perception of Spatial Orientations", published in Exp Brain Res (2008) 187:331-348, published online Apr. 30, 2008, retrieved Sep. 27, 2021 (Year: 2008).*

Heather Culbertson et al, "Haptics: The Present and Future of Artificial Touch Sensations", published in Annu. Rev. Control Robot. Auton. Syst. 2018, 1:12.1-12.25, published online at https://doi.org/10.1146/annurev-control-060117-105043, retrieved Sep. 27, 2021 (Year: 2018).*

Yasemin Vardar, "Tactile Perception by Electrovibration", published Jan. 2018, retrieved from online on Sep. 27, 2018 from https://www.is.mpg.de/uploads_file/attachment/attachment/479/vardar_phd_thesis.pdf (Year: 2018).*

Marco Vicentini et al, "Signal Manipulation Based on Perceptual Thresholds Enhances Surface Experience with Common Haptic Device", published at Third Joint Eurohaptics Conference and Symposium on Haptic Interfaces for Virtual Environment and Teleoperator Systems, Salt Lake City, UT, USA, Mar. 2009 (Year: 2009).*

Carlos Bermejo et al, "A Survey on Haptic Technologies for Mobile Augmented Reality", date stamped Sep. 12, 2017, available online at arxiv.org/pdf/1709.00698.pdf, retrieved Sep. 27, 2021 (Year: 2017).*

Peter B.Shull and Dana D. Damian, "Haptic wearables as sensory replacement, sensory augmentation and trainer—a review", Journal of NeuroEngineering and Rehabilitation, 12:59, published 2015, retrieved on Mar. 16, 2022. (Year: 2015).*

Karlin Bark et al, "Efffects of Vibrotactile Feedback on Human Learning of Arm Motions", IEEE Trans Neural Syst Rehabil Eng., 23(1): 51-63, published Jan. 2015, retrieved on Mar. 16, 2022. (Year: 2015).*

Kimberly Myles and Mary S. Binseel, "The Tactile Modality: A Review of Tactile Sensitivity and Human Tactile Interfaces", published May 2007, retrieved on Mar. 16, 2022. (Year: 2007).*

Ed Colgate, "The Emerging Vocabulary of Haptics: Vibration vs Texture", published on Jan. 2, 2017 to https://medium.com/feelingdisruptive/the-emerging-vocabulary-of-haptics-vibration-vs-texture-6eacea631ca4, retrieved Dec. 5, 2022. (Year: 2017).*

Semin Ryu, Dongbum Pyo, Soo-Chul Lim, Dong-Soo Kwon, "Mechanical Vibration Influences the Perception of Electrovibration", published online on Mar. 14, 2018 to https://www.ncbi.nlm.nih.gov/pmc/articles/PMC5852143, retrieved Dec. 5, 2022. (Year: 2018).*

James Lewis, "What's the Difference Between Haptics Now and Then?", published on Sep. 4, 2013 to https://www.electronicdesign.com/technologies/components/article/21798404/whats-the-difference-between-haptics-now-and-then, retrieved Dec. 5, 2022. (Year: 2013).*

* cited by examiner

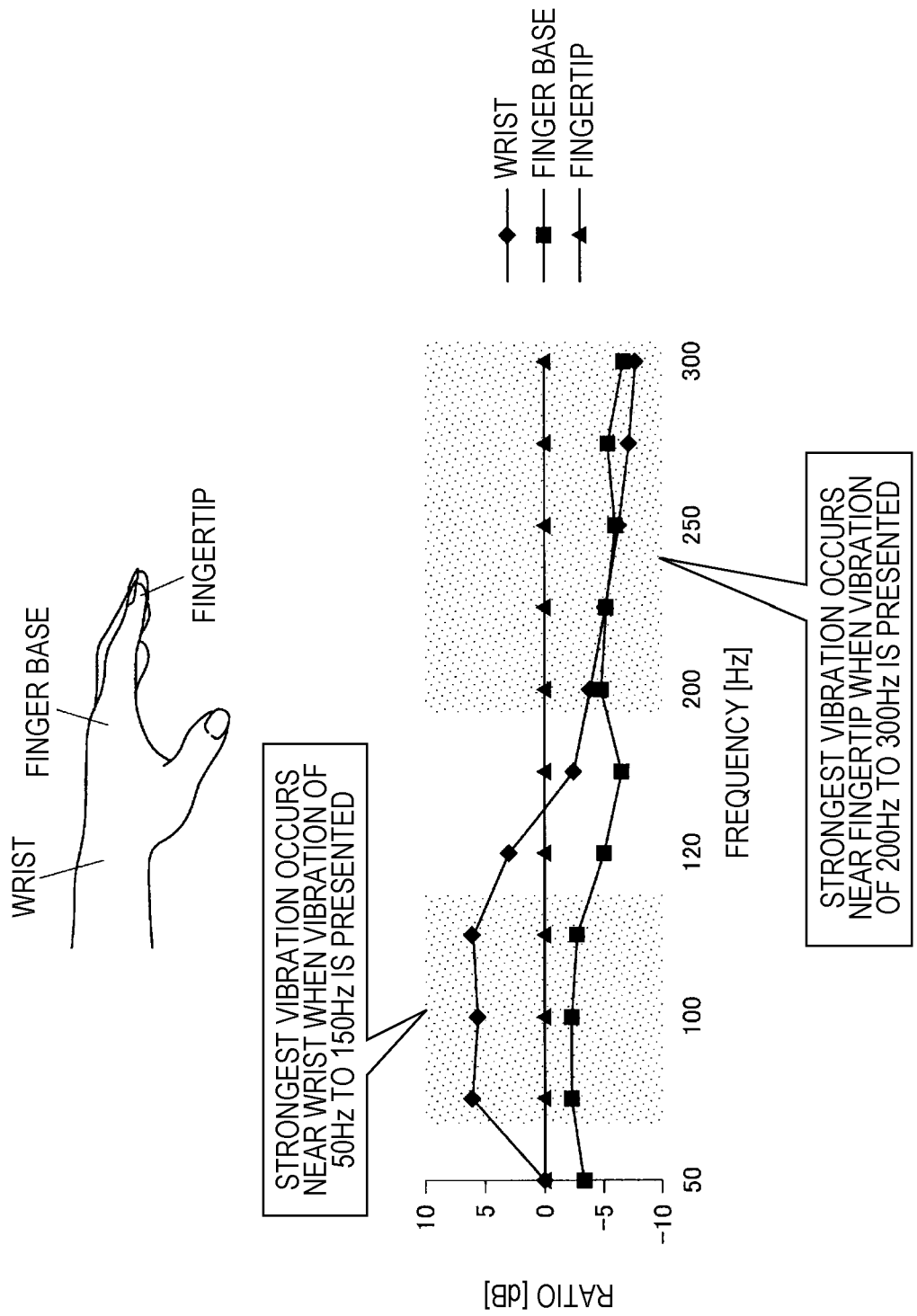

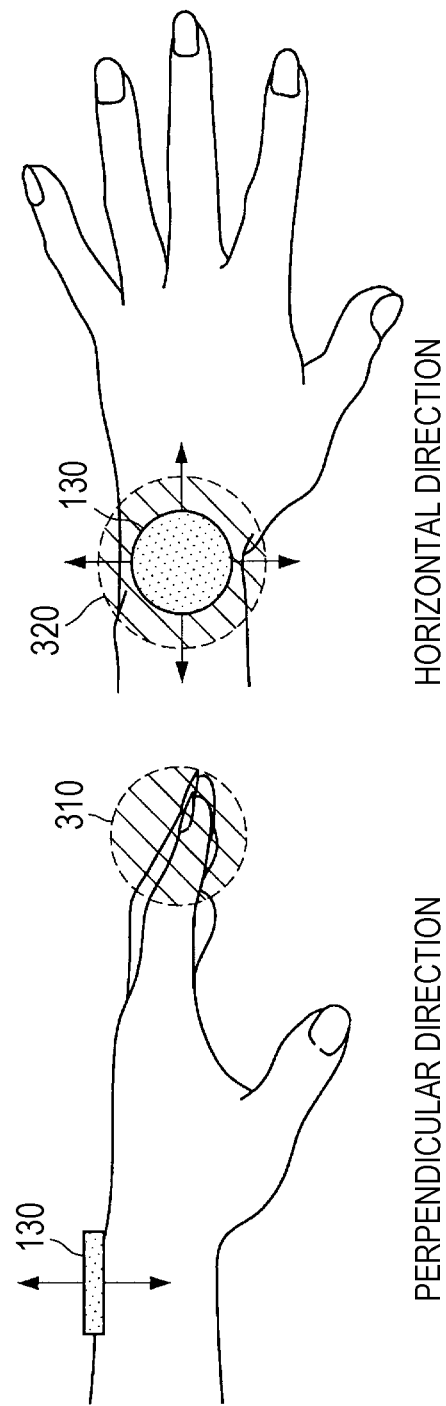

FIG. 5A
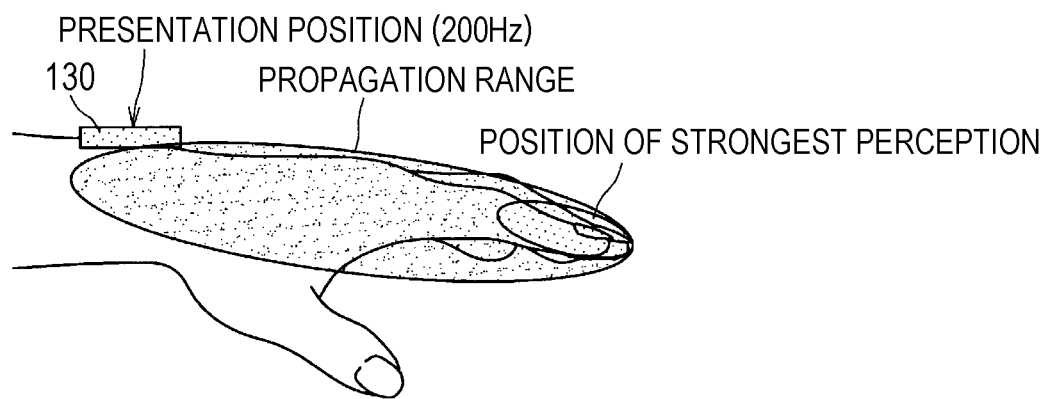
FIG. 5B
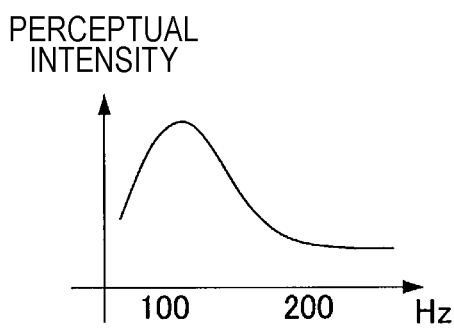
PERCEPTUAL CHARACTERISTIC
NEAR WRIST
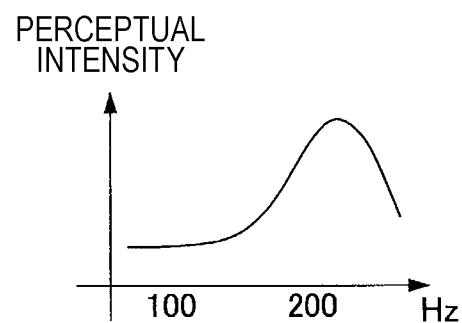
PERCEPTUAL CHARACTERISTIC
NEAR FINGERTIP FIG. 8
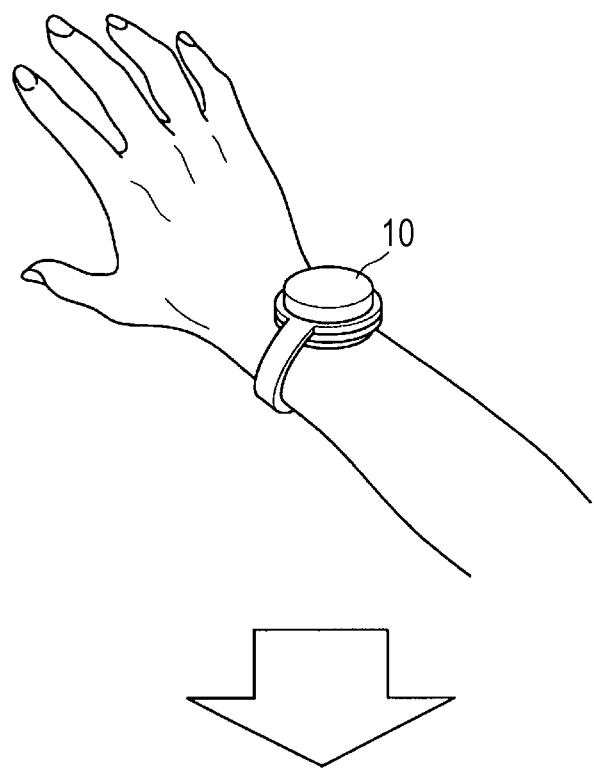
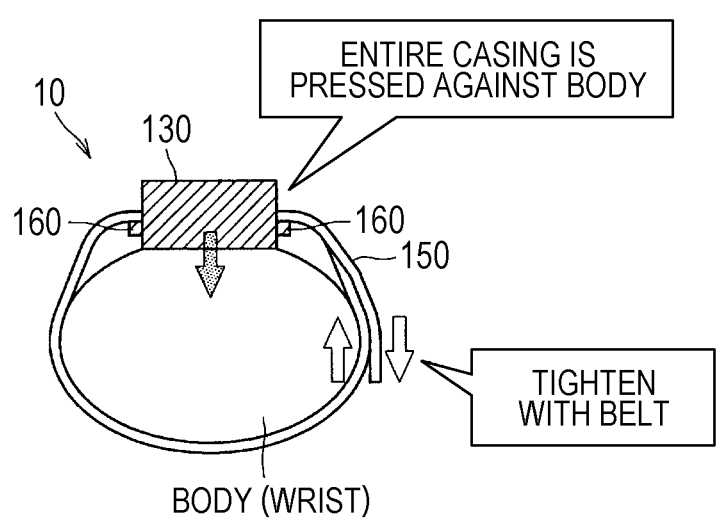

INFORMATION PROCESSING APPARATUS, METHOD FOR PROCESSING INFORMATION, AND PROGRAM

CROSS REFERENCE TO PRIOR APPLICATION

This application is a National Stage Patent Application of PCT International Patent Application No. PCT/JP2019/023115 (filed on Jun. 11, 2019) under 35 U.S.C. § 371, which claims priority to Japanese Patent Application No. 2018-116258 (filed on Jun. 19, 2018), which are all hereby incorporated by reference in their entirety.

TECHNICAL FIELD

The present disclosure relates to an information processing apparatus, a method for processing information, and a program.

BACKGROUND ART

Conventionally, various techniques for presenting a tactile stimulus such as vibrations to a user have been proposed.

For example, Patent Document 1 set out below discloses a technique for generating vibrations from a plurality of tactile stimulus units arranged in clothes worn by a user and moving a perceptual position.

CITATION LIST

Patent Document

Patent Document 1: International Publication No. 2018/008217

SUMMARY OF THE INVENTION

Problems to be Solved by the Invention

Although the perceptual position on a body is moved by controlling output intensity of each of the plurality of tactile stimulus units in the prior art mentioned above, has been difficult to achieve such movement of the perceptual position in a case where only one tactile stimulus unit is used.

In view of the above, the present disclosure proposes an information processing apparatus, a method for processing information, and a program capable of adjusting a perceptual position of a tactile stimulus even with one tactile stimulus unit.

Solutions to Problems

According to the present disclosure, there is proposed an information processing apparatus including an output control unit that performs output control of a vibration on at least one tactile stimulus unit, in which the output control unit changes a frequency of the vibration to be output from the tactile stimulus unit depending on a position of the tactile stimulus unit and predetermined positional information.

According to the present disclosure, there is proposed a method for processing information that causes a processor to control output of a vibration on at least one tactile stimulus, unit and to change a frequency of the vibration to be output from the tactile stimulus unit depending on a position of the tactile stimulus unit and predetermined positional information.

According to the present disclosure, there is proposed a program that causes a computer to function as an output control unit that performs output control of a vibration on at least one tactile stimulus unit, in which the output control unit changes a frequency of the vibration to be output from the tactile stimulus unit depending on a position of the tactile stimulus unit and predetermined positional information.

Effects of the Invention

As described above, according to the present disclosure, it becomes possible to adjust a perceptual position of a tactile stimulus even with one tactile stimulus unit.

Note that the effect described above is not necessarily limited, and any of the effects described in the present specification or another effect that can be understood from the present specification may be exerted in addition to the effect described above or instead of the effect described above.

BRIEF DESCRIPTION OF DRAWINGS

FIG. 3 is a diagram illustrating exemplary transfer characteristic information according to a frequency according to the present embodiment.

FIG. 4 is a diagram for explaining a vibrational transmission according to a vibration direction according to the present embodiment.

FIG. 5A is a diagram illustrating exemplary perception of a tactile effect in a case where a tactile presentation device according to the present embodiment is worn on a wrist and vibrations are generated.

FIG. 5B is a graph illustrating exemplary characteristics of perceptual intensity of a vibration stimulus near a wrist and near a fingertip according to the present embodiment.

FIG. 8 is a diagram illustrating an exemplary structure for tightening the tactile presentation device according to the present embodiment on the body according to the present embodiment.

MODE FOR CARRYING OUT THE INVENTION

Hereinafter, a preferred embodiment of the present disclosure will be described in detail with reference to the accompanying drawings. Note that, in the present specification and the drawings, constituent elements having substantially the same functional configuration will be denoted by the same reference signs, and duplicate descriptions thereof will be omitted.

Furthermore, descriptions will be given in the following order.

1. Overview of Information Processing System According to Embodiment of Present Disclosure
2. Exemplary Configuration
   2-1. Configuration of Information Processing Apparatus 20
   2-2. Configuration of Tactile Presentation Device 10
3. Operation Process
4. Applications
   4-1. Application to Other Body Parts
   4-2. Structure for Tightening Tactile Presentation Device 10 on Body
   4-3. Vibration Phase Matching
   4-4. Presentation Control of Tactile Stimulus According to Hand State
   4-5. Others
5. Summary <<1. Overview of Information Processing System According to Embodiment of Present Disclosure>>

Figure 1:
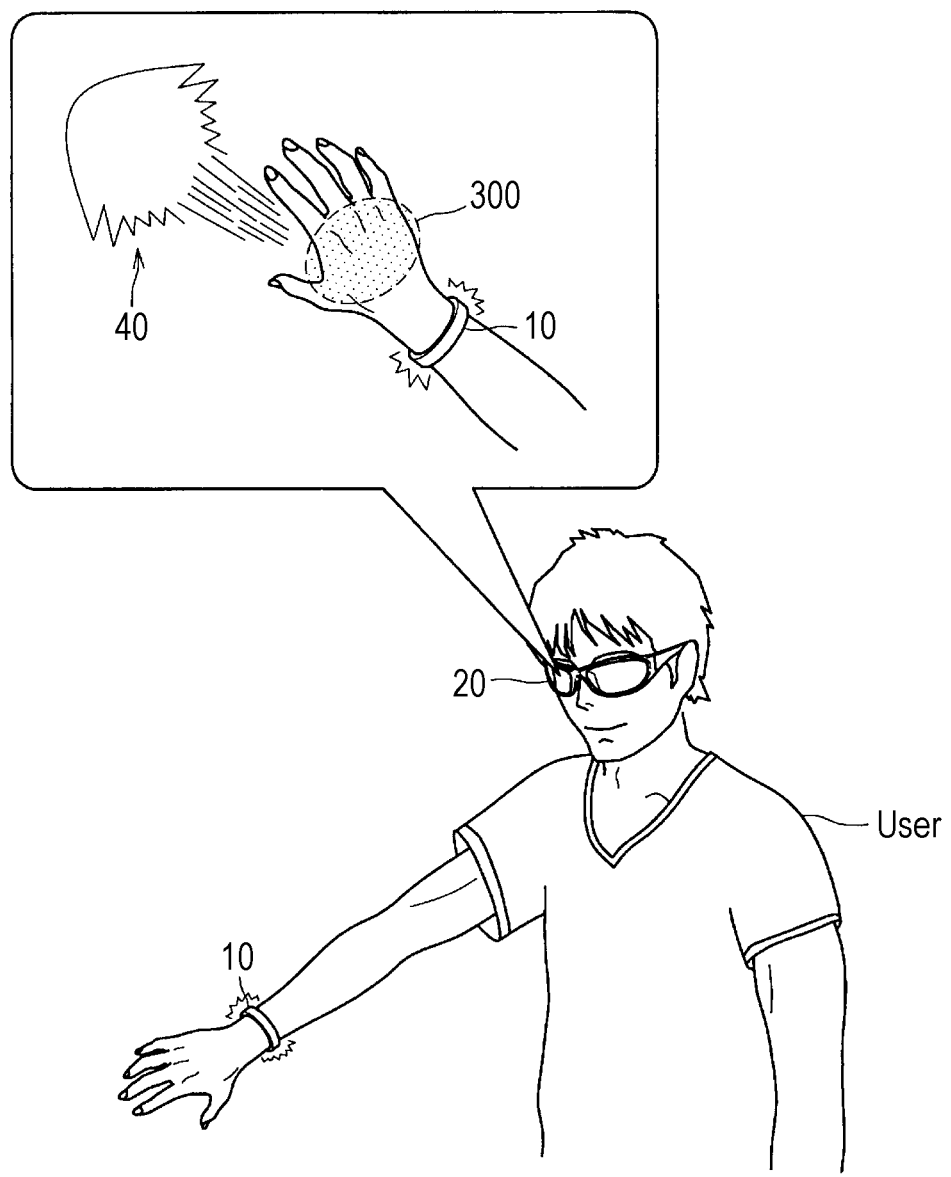
FIG. 1 is a diagram illustrating an overview of an information processing system according to an embodiment of the present disclosure.

FIG. 1 is a diagram illustrating an overview of an information processing system according to an embodiment of the present disclosure. In the information processing system according to the present embodiment, for example, a tactile presentation device 10 worn on a wrist of a user outputs vibrations of a predetermined frequency as illustrated in FIG. 1, thereby making a palm or fingertip of the user perceive a tactile stimulus on the basis of characteristics of the body. The tactile presentation device 10 is provided with at least one tactile stimulus unit 130. Even in the case of vibration output from one tactile stimulus unit 130, the tactile presentation device 10 according to the embodiment is capable of setting a position (e.g., fingertip, palm, etc.) away from the contact position (e.g., wrist) of the tactile stimulus unit 130 as a perceived position 300.

In this manner, a tactile stimulus can be perceived at a position away from the contact position of the tactile presentation device 10, whereby the tactile stimulus can be presented to the palm or fingertip without disturbing a realistic tactile sense or function of the hand, for example.

Furthermore, the tactile presentation device 10 according to the present embodiment is capable of moving the perceived position from the wrist to the palm, fingertip, or the like by the vibration output from at least one tactile stimulus unit 130. With the movement of the perceived position being achieved using one tactile stimulus unit 130 as described above, it becomes possible to achieve downsizing, cost reduction, weight saving, and the like of the device.

Details of adjustment control of the perceived position based on the characteristics of the body with be described later with reference to FIGS. 3 to 5.

Furthermore, the tactile stimulus by the tactile presentation device 10 according to the present embodiment may be presented to ether with a visual stimulus and/or an auditory stimulus based on augmented reality. For example, as illustrated in FIG. 1, using a head mounted display (HMD) of a glasses-type (exemplary information processing apparatus 20) worn on the user's head, an augmented-reality (AR) image 40 (3D image, etc.) in which a beam or wave is emitted from the user's hand is displayed on a display provided on the lens of the glasses positioned in front of the user's eyes, and the tactile presentation device 10 performs control to output vibrations, whereby the user's palm or fingertip is caused to perceive a tactile sense together with the display of the beam or wave (visual stimulus). As a result, it becomes possible to present, to the user, a sense as if the beam or wave were actually emitted from the palm, whereby more realistic augmented reality can be achieved. Note that the information processing apparatus 20 can further enhance the realistic feeling of the augmented reality by performing voice control to output sound effects of the beam and wave. The audio output is reproduced from the information processing apparatus 20, a speaker device (not illustrated) around the device, earphones worn by the user, or the like.

Note that the visual stimulus is not limited to the display of the AR image using the HMD, and may be, for example, image projection using a projector.

The information processing system according to the embodiment of the present disclosure has been described above. Next, a specific configuration of each device included in the information processing system according to the present embodiment will be described with reference to the accompanying drawings.

<<2. Exemplary Configuration>>

Figure 2:
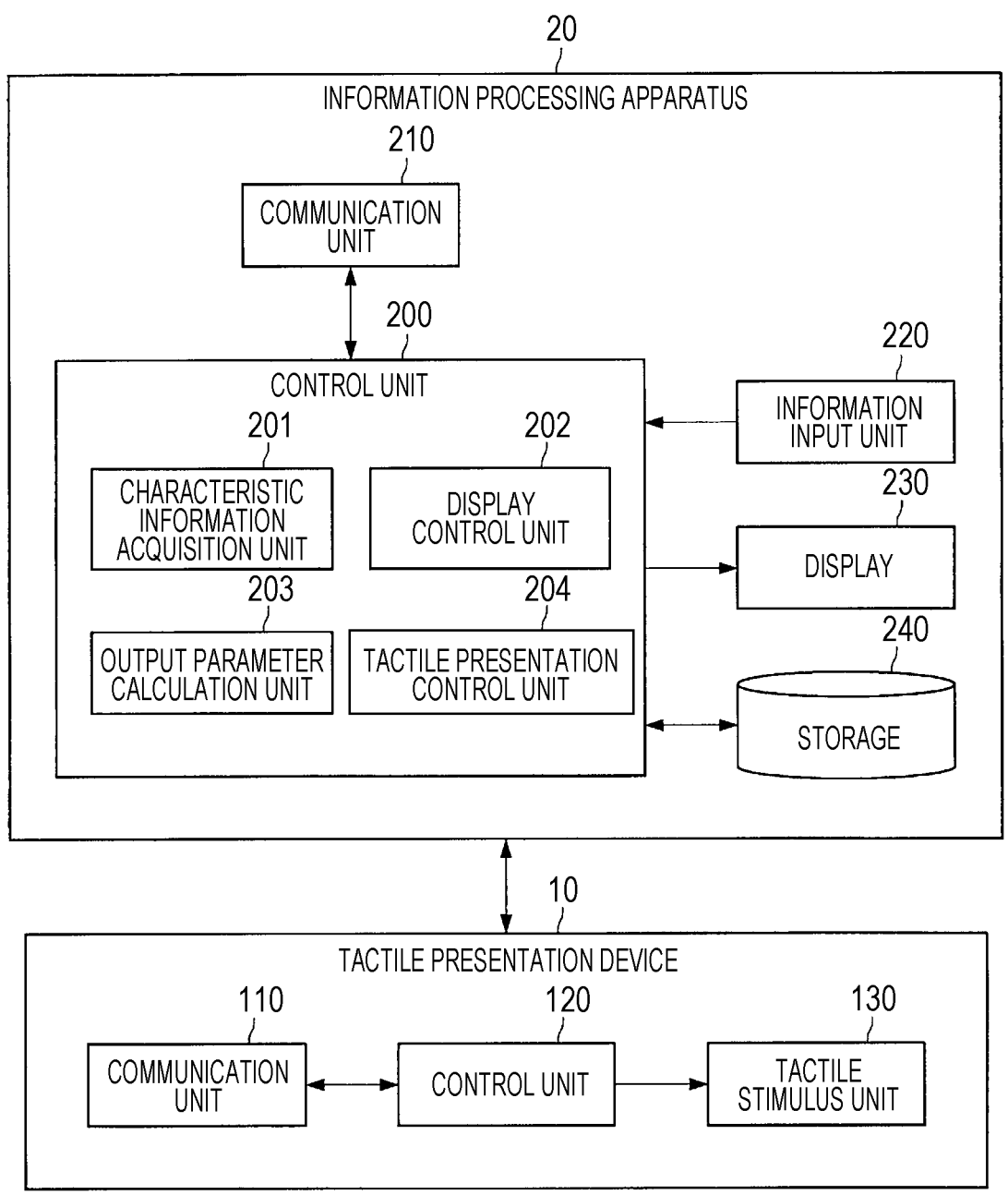
FIG. 2 is a block diagram illustrating exemplary configurations of an information processing apparatus and a tactile presentation device included in the information processing system according to the present embodiment.

FIG. 2 is a block diagram illustrating exemplary configurations of the information processing apparatus 20 and the tactile presentation device 10 according to the present embodiment. Hereinafter, a configuration of each device will be described.

<2-1. Configuration of Information Processing Apparatus 20>

As illustrated in FIG. 2, the information processing apparatus 20 includes a control unit 200, a communication unit 210, an information input unit 220, a display 230, and a storage 240.

(Control Unit 200)

The control unit 200 functions as an arithmetic processing device and a control device, and controls overall operation in the information processing apparatus 20 according to various programs. The control unit 200 is constructed by an electronic circuit such as a central processing unit (CPU), a microprocessor, and the like. Furthermore, the control unit 200 may include a read only memory (ROM) that stores programs, operation parameters, and the like to be used, and a random access memory (RAM) that temporarily stores parameters and the like that change as appropriate.

Furthermore, as illustrated in FIG. 2, the control unit 200 according to the present embodiment also functions as a characteristic information acquisition unit 201, a display control unit 202, an output parameter calculation unit 203, and a tactile presentation control unit 204.

The characteristic information acquisition unit 201 obtains, from the storage 240, characteristic information of the body around the body part (contact position) where the tactile presentation device 10 is worn and the target perceptual position (predetermined positional information on the body) or between them. The contact position may be registered in advance, or may be determined according to the type of the tactile presentation device 10. For example, in the case of the tactile presentation device 10 in which the wearing position is preset such as for wrist wearing, for shin wearing, or for abdomen wearing, for example, the ID of the tactile presentation device 10 may be received to determine the contact position (wearing position). A target perceptual position is determined according to the movement of the user and the display content (including display position) on the display 230. For example, in a case where the user performs operation of tapping the operation screen (AR image) displayed in the air by the display 230 of the HMD, the user's fingertip is set as the target perceptual position and the fingertip is caused to perceive vibrations, thereby presenting a tap feeling in the air. For example, information obtained from an outward-facing camera or a distance sensor provided in the information processing apparatus 20 or information obtained from a motion sensor (not illustrated) provided in the tactile presentation device 10 is analyzed, whereby the movement of the user can be recognized by the control unit 200.

The characteristic information of the body to be obtained includes, for example, transfer characteristic information. The transfer characteristic information indicates information associated with a transfer of vibrations in the body. Here, FIG. 3 illustrates an example of the vibration transfer characteristic information according to a frequency according to the present embodiment. In the example illustrated in FIG. 3, vibration transfer characteristics of a human body (wrist, finger base, and fingertip) in a case where, for example, vibrations of 50 Hz to 300 Hz is presented to the wrist are expressed by transmissibility. As illustrated in FIG. 3, in a case where, for example, the vibrations are presented in a low frequency range of 50 Hz to 150 Hz, the strongest vibration occurs near the wrist. Meanwhile, in a case where the vibrations are presented in a high frequency range of 200 Hz to 300 Hz, the strongest vibration occurs near the fingertip. That is, while the vibrations in the low frequency range are not transmitted to the fingertip, the vibrations in the high frequency range are transmitted to the fingertip although they are somewhat attenuated. It is presumed that such a phenomenon occurs due to the fact that the vibrations tend to propagate mainly through flesh of the human body in the case of the low frequency range of 50 Hz to 150 Hz, and the vibrations tend to propagate mainly through bones of the human body in the case of the high frequency range of 200 Hz to 300 Hz. Note that, although the vicinity of 50 Hz to 150 Hz is referred to as a "low frequency range" and the vicinity of 200 Hz to 300 Hz is referred to as a "high frequency range", those numerical values and ranges are merely examples, and the present embodiment is not limited thereto. Furthermore, a gap is provided between the low frequency range and the high frequency range as an example here, which makes it possible to easily recognize the difference between the perceived position of the tactile effect based on the vibrations in the low frequency range and the perceived position of the tactile effect based on the vibrations in the high frequency range. However, the present embodiment is not limited to separating the low frequency range and the high frequency range. For example, when the perceptual position is moved away from the contact position, the frequency may be continuously changed from 50 Hz to 300 Hz (numerical value is an example).

On the basis of such vibration transfer characteristic information, the control unit 200 can adjust the target perceptual position by controlling the frequency of the vibrations. Furthermore, the control unit 200 can move the perceptual position of the tactile effect (e.g., move the perceptual position between the vicinity of the wrist and the vicinity of the fingertip) by changing the frequency of the vibrations to be presented with time.

Furthermore, as an example of the vibration transfer characteristic information, information associated with the vibration transfer according to the vibration direction of the tactile stimulus unit 130 is also included. FIG. 4 is a diagram for explaining the vibrational transmission according to the vibration direction according to the present embodiment. For example, in a case where the vibration frequency is in the high frequency range (near 200 to 300 Hz as an example) and the vibration direction is set to the direction perpendicular to the body surface as illustrated in the left side of FIG. 4, the vibrations (tactile effect) are perceived more strongly near the fingertip (see perceived position 310). Furthermore, in a case where the vibration frequency is in the high frequency range and the vibration direction is set to the horizontal direction as illustrated in the right side of FIG. 4, the vibrations are perceived more strongly near the wrist (see perceived position 320). Such phenomena occur because the vibrations in the perpendicular direction are less likely to be absorbed by the human body than the vibrations in the horizontal direction when the vibrations propagate through the human body.

On the basis of such vibration transfer characteristic information, the control unit 200 can adjust the target perceptual position by controlling the vibration direction of the vibrations to be presented. Furthermore, the control unit 200 can move, without changing the vibration frequency, the perceptual position of the tactile effect (e.g., move from the vicinity of the wrist to the vicinity of the fingertip) by changing the vibration direction of the vibrations to be presented with time (e.g., from the perpendicular direction to the horizontal direction, or from the horizontal direction to the perpendicular direction).

Furthermore, the characteristic information of the body to be obtained may include perceptual characteristic information. The perceptual characteristic information indicates information associated with perception (cutaneous sense) of a tactile stimulus in the body such as vibrations. For example, as illustrated in FIG. 5A, in a case where vibrations are output from the tactile stimulus unit 130 worn on the wrist at a frequency near 200 Hz, the vibrations propagate to a wide area of the entire hand through bones of the human body, and are perceived most strongly by particularly the fingertip. Examples of the perceptual characteristic information according to the present embodiment include such information regarding which part of the human body is more likely to perceive vibrations in which frequency range.

Note that the reason why the cutaneous sense differs depending on the human body part is that the condition of tissues constituting the skin is different. In general, of the sensory receptors distributed to the skin, while four types of tactile receptors particularly respond to tactile stimuli, various tactile receptors differ in the frequency range of vibration stimuli to which they mainly respond. Since those various tactile receptors are distributed in the surface skin and deep part of the body, the frequency range of the vibration stimuli that easily reacts differs depending on a human body part. On the basis of such perceptual characteristics, for example, there has been known the amount of stimuli that humans determine to be the same stimuli when different stimuli are given to a body part, more specifically, an equal sensation curve showing a curve that humans determine to be the same stimuli (equal vibration magnitude (dB)) when different frequencies are given in vibration stimuli.

FIG. 5B illustrates an exemplary characteristic of perceptual intensity of a vibration stimulus near the wrist and near the fingertip. The characteristic of the perceptual intensity may be generated on the basis of the equal sensation curve described above. Note that the characteristic of the perceptual intensity illustrated in FIG. 5B is an example, and the relationship between the vibration stimulus frequency and the perceptual intensity is not limited thereto. As an example, in a case where the perceptual characteristic information as illustrated in FIG. 5B is obtained, it is understood that the vibration stimulus frequency near 100 Hz is more strongly perceived near the wrist, and the vibration stimulus frequency near 200 Hz is more strongly perceived near the fingertip.

Therefore, the control unit 200 is enabled to adjust the perceptual position by controlling the output frequency. Furthermore, the control unit 200 is enabled to move the perceptual position of the tactile effect (e.g., move the perceptual position between the vicinity of the wrist and the vicinity of the fingertip) by changing the output frequency.

The display control unit 202 controls display of images on the display 230. The display control unit 202 is capable of drawing a display image on the display 230 on the basis of content data obtained from a network via the storage 240 or the communication unit 210. For example, the display control unit 202 performs control to, on the basis of the content data, display an AR image (3D or 2D image, still image, moving image, etc.) according to a situation such as user operation, positional information, surrounding environment, or the like.

The output parameter calculation unit 203 calculates a parameter related to vibration stimulus output from the tactile stimulus unit 130 in the tactile presentation device 10. Specifically, the output parameter calculation unit 203 calculates output parameters (output intensity, frequency, vibration direction, etc.) of the tactile stimulus from the tactile stimulus unit 130 on the basis of the target perceptual position based on the movement of the user and the display content (display position) on the display 230, the contact position (of the tactile stimulus unit 130), and the vibration transfer characteristic information and the perceptual characteristic information between them.

The tactile presentation control unit 204 controls the tactile presentation from the tactile stimulus unit 130 in the tactile presentation device 10. Specifically, the tactile presentation control unit 204 controls the output parameters (output intensity, frequency, vibration direction, etc.) calculated by the output parameter calculation unit 203 to transmit them from the communication unit 210 to the tactile presentation device 10 as control signals for the tactile stimulus. Furthermore, the tactile presentation, control unit 204 presents the tactile information to the user in combination with the output of the visual information and the auditory information of the augmented reality as described above, thereby making it possible to make the user feel the reality more effectively. For example, the tactile presentation control unit 204 performs control to present a predetermined tactile stimulus from the tactile presentation device 10 in accordance with the content of the visual information output from the display 230 and the auditory information output from an audio output unit (not illustrated).

(Communication Unit 210)

The communication unit 210 connects to an external device by wire or wirelessly, and exchanges data with the external device. For example, the communication unit 210 may communicate with and connect to the tactile presentation device 10 via a network that connects using a communication scheme such as a wired/wireless local area network (LAN), Wi-Fi (registered trademark), Bluetooth (registered trademark), a portable communication network (long term evolution (LTE)), and 3G (third generation mobile communication scheme) or directly using a wireless or wired communication scheme such as W-Fi Bluetooth, or the like, to exchange data with the tactile presentation device 10.

(Information Input Unit 220)

The information input unit 220 receives input of various kinds of information to the information processing apparatus 20. For example, the information input unit 220 includes an operation input unit that receives an operation input made by the user, and a voice input unit that receives a voice input. The operation input unit may be, for example, a touch sensor, a pressure sensor, or a proximity sensor. Alternatively, the operation input unit may have a physical configuration such as a button, a switch, and a lever. Furthermore, the information input unit 220 includes a microphone, a camera, a sensor, and the like, and obtains various kinds of sensing data. The camera may include, for example, an outward-facing camera for obtaining, surrounding environment and a field of view of the user, and an inward-facing camera for imaging the user's eyes to detect line-of-sight information of the user and the like. Further-more, examples of the sensor include a motion sensor (acceleration sensor, gyroscope sensor, or geomagnetic sensor), an ultrasonic sensor, an infrared sensor, a distance sensor, a biological sensor (pulse, heartbeat, blood pressure, sweating, body temperature, breathing, blink, myoelectric value, brain waves, etc.), a position sensor, and the like. Those sensor data, camera data, and audio data are used for recognition of the user's operation, surrounding environment, and the like.

(Display 230)

The display displays an AR image and the like under the control of the display control unit 202. In a case where the information processing apparatus 20 is a device that presents augmented reality information (e.g., glasses-type HMD), an optical transmissive display or a video transmissive display is used as the display 230 that superimposes and displays virtual 3D objects and the like in the real world.

Furthermore, the output parameter calculation unit 203 may be a display device such as a liquid crystal display (LCD) and an organic electro luminescence (EL) display.

(Storage 240)

The storage 240 is constructed by a read only memory (ROM) that stores programs, operation parameters, and the like to be used in the processing of the control unit 200, and a random access memory (RAM) that temporarily stores parameters and the like that change as appropriate.

The configuration of the information processing apparatus 20 according to the present embodiment has been specifically described above. The information processing apparatus 20 is not limited to the HMD as illustrated in FIG. 1, and may be constructed by a smartphone, a mobile phone terminal, a tablet terminal, a dedicated terminal, or the like.

Furthermore, the configuration of the information processing apparatus 20 is not limited to the example illustrated in FIG. 2. For example, the information processing apparatus 20 may be configured by a plurality of devices, or the information processing apparatus 20 may not necessarily include all the configurations illustrated in FIG. 2. Furthermore, the information processing apparatus 20 may further include a speaker (audio output unit), and the display 230 may be constructed by a projector. Furthermore, the information processing apparatus 20 may transmit acoustic data to an external speaker (environment-side speaker, speaker worn by the user, etc.) to control audio output.

Furthermore, at least a part of each configuration of the control unit 200 illustrated in FIG. 2 may be constructed by an external device (personal computer (PC), smartphone, tablet terminal, server, etc.).

Furthermore, the information processing apparatus 20 may be constructed by a device (HMD, PC, smartphone, tablet terminal server, etc.) that mainly processes content data (video data, acoustic data, and tactile data) and a device (HMD, PC, smartphone, tablet terminal, server, etc.) that mainly performs processing for correcting (tactile stimulus) control signals directed to the tactile presentation device 10 according to the target perceptual position, transfer characteristic information, and perceptual characteristic information.

<2-2. Configuration of Tactile Presentation Device 10>

As illustrated in FIG. 2, the tactile presentation device 10 according to the present embodiment includes a communication unit 110, a control unit 120, and a tactile stimulus unit 130.

(Control Unit 120)

The control unit 120 functions as an arithmetic processing device and a control device, and controls overall operation in the tactile presentation device 10 according to various programs. The control unit 120 is constructed by an electronic circuit such as a central processing unit (CPU), a microprocessor, and the like. Furthermore, the control unit 120 may include a read only memory (ROM) that stores programs, operation parameters, and the like to be used, and a random access memory (RAM) that temporarily stores parameters and the like that change as appropriate.

For example, the control unit 120 controls the tactile stimulus unit 130 according to the control signals (at a predetermined frequency, output intensity, and vibration direction) received from the information processing apparatus 20 by the communication unit 110, and presents a tactile stimulus (specifically, vibrations).

(Communication Unit 110)

The communication unit 110 connects to an external device by wire or wirelessly, and exchanges data with the external device. The communication unit 110 communicates with and connects to the information processing apparatus 20 via, for example, a wired/wireless local area network (LAN), Wireless Fidelity (Wi-Fi, registered trademark), Bluetooth, or the like, and receives the control signals.

(Tactile Stimulus Unit 130)

The tactile stimulus unit 130 has a function of Presenting a tactile stimulus (specifically, vibrations) by an actuator or an electric stimulus.

The configuration of the tactile presentation device 10 according to the present embodiment has been specifically described above. Note that the configuration of the tactile presentation device 10 illustrated in FIG. 2 is an example, and the present embodiment is not limited thereto. Although illustration is omitted, the tactile presentation device 10 may elude storage. The storage is constructed by a ROM that stores programs, operation parameters, and the like to be used for the processing of the control unit 120, and a RAM that temporarily stores parameters and the like that change as appropriate.

Furthermore, the tactile presentation device 10 may include various sensors such as a motion sensor, a biological sensor, a camera, and a microphone. The tactile presentation device 10 transmits sensing data obtained by various sensors to the information processing apparatus 20. The transmitted sensing data is used by the information processing apparatus 20 to recognize, for example, user operation (hand gesture, etc.).

Furthermore, the output parameter calculation unit 203 and the tactile presentation control unit 204 included in the control unit 200 of the information processing apparatus 20 may be constructed by the control unit 120 of the tactile presentation device 10. At that time, the information processing apparatus 20 may have transfer characteristic in or perceptual characteristic information.

<<3. Operation Process>>

Figure 6:
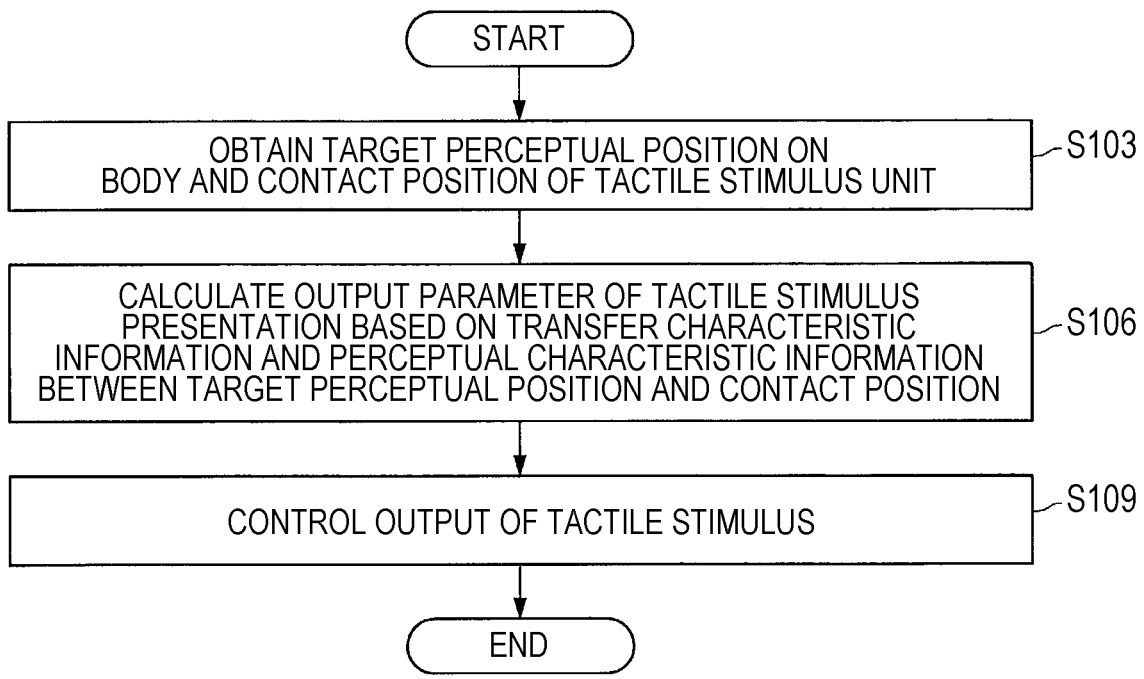
FIG. 6 is a flowchart illustrating an exemplary flow of output control of a tactile stimulus according to the present embodiment.

Next, an operation process of the information processing system according to the present embodiment will be specifically described with reference to the accompanying drawings. FIG. 6 is a flowchart illustrating an exemplary flow of output control of a tactile stimulus according to the present embodiment.

As illustrated in FIG. 6, first, the control unit 200 of the information processing apparatus 20 obtains a target perceptual position and a contact position (of the tactile stimulus unit 130) on the body (step S103).

Next, the output parameter calculation unit 203 of the information processing apparatus 20 calculates output parameters (specifically, vibration output frequency, intensity, vibration direction, etc.) of tactile stimulus presentation on the basis of transfer characteristic information and perceptual characteristic information between the target perceptual position and the contact position (step S106).

Next, the tactile presentation control unit 204 the information processing apparatus 20 transmits the calculate, output parameters to the tactile presentation device 10, and performs output control of the tactile stimulus from the tactile stimulus unit 130 of the tactile presentation device 10 (step S109).

An example of the operation process according to the present embodiment has been described above. Note that the operation process illustrated in FIG. 6 is an example, and the present disclosure is not limited to the example illustrated in FIG. 6.

Furthermore, although only the output control of the tactile stimulus is disclosed in the operation process illustrated in FIG. 6, the information processing apparatus 20 may also perform display control and audio output control.

For example, in accordance with user operation (e.g., attack action during game play, etc.) the formation processing apparatus 20 controls the display control unit 202 to display, on the display 230, AR images according to the user operation, and also determines a target perceptual position to control the tactile presentation control unit 204 to present a tactile stimulus. For example, in the case of displaying an AR image in which a beam or a wave is emitted from a hand on the basis of the attack action of the user, the tactile presentation control unit 204 controls the frequency of the vibration stimulus and the vibration direction by the tactile presentation device 10 worn on the user's wrist in such a manner that the tactile effect is perceived by the user's palm or fingertip. Furthermore, the information processing apparatus 20 may perform control to change the frequency and the vibration direction with time so that the perceptual position of the tactile effect moves from the user's palm to the fingertip according to the display of the AR image.

Furthermore, the information processing apparatus 20 may perform control to cause the user's fingertip to perceive the tactile effect at a timing of tap operation when the user makes a tap operation on the AR image such as an operation screen displayed in the by the display 230, whereby a tap feeling in the air can be presented.

As a result, it becomes possible to provide the sense of reality of augmented reality more effectively.

<<4. Applications>>

Next, applications of the present embodiment 11 be described.

<4-1. Application to Other Body Parts>

Although an exemplary case where the tactile presentation device 10 is worn on the wrist has been described in the embodiment described above, the present embodiment is not limited thereto, and it is also Possible to be worn on another body part and cause the tactile effect to be perceived at a position in the vicinity of the contact position or away from the contact position in a similar manner.

Figure 7:
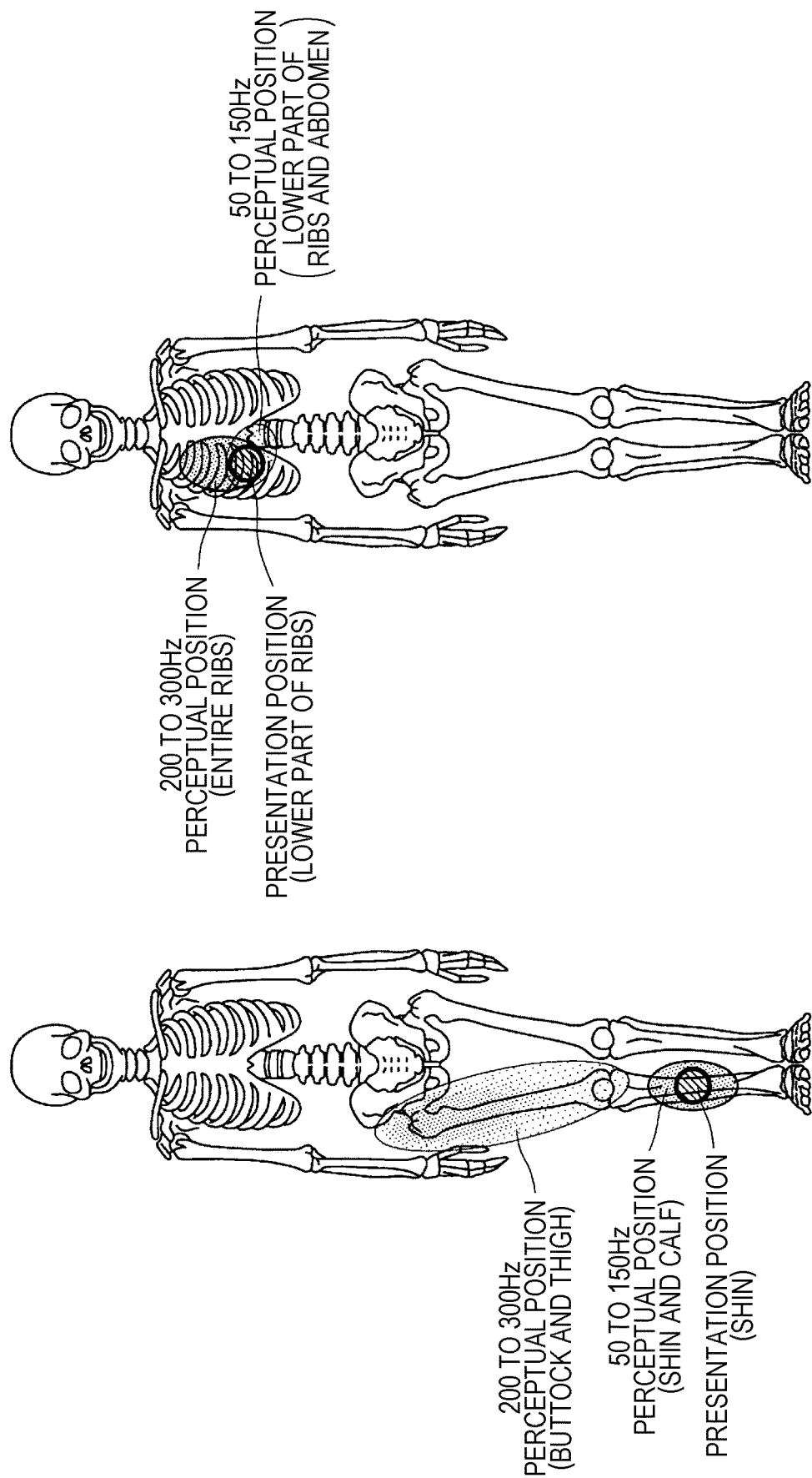
FIG. 7 is a diagram illustrating an example of a case where the tactile presentation device is worn on a body part other than the wrist and a tactile stimulus is presented.

FIG. 7 is a diagram illustrating an example of a case where the tactile presentation device 10 is worn on a body part other than the wrist and a tactile stimulus is presented. As illustrated in the left side of FIG. 7, for example, in a case where the tactile stimulus is presented on the "shin" (i.e., in a case where the tactile presentation device 10 is worn on the "shin"), the tactile effect is perceived around the shin and calf in the case of vibrations in a low frequency range of 50 to 150 Hz or the like. Furthermore, in the case of vibrations in a high frequency range of 200 to 300 Hz or the like, the vibrations propagate through bones and spread over a wide area of buttocks and highs, and can be more strongly perceived particularly at around the base of the legs (pelvis).

Furthermore, as illustrated in the right side of FIG. 7, for example, in a case where the tactile stimulus is presented on the "lower part of the ribs" (i.e., in a case where the tactile presentation device 10 is worn on the "lower part of the ribs"), the tactile effect is perceived around the lower part of the ribs and abdomen in the case of vibrations in a low frequency range of 50 to 150 Hz or the like. Furthermore, in the case of vibrations in a high frequency range of 200 to 300 Hz or the like, the vibrations propagate through bones and spread over the entire ribs, and can be perceived.

<4-2. Structure for Tightening Tactile Presentation Device 10 on Body>

Next, a structure for tightening the tactile presentation device 10 on the body according to the present embodiment will be described. The tactile presentation device 10 preferably has a structure capable of pressing the tactile stimulus unit 130 against the body at a position closer to the body. With the tactile stimulus unit 130 being pressed against the body, it becomes possible to present the tactile stimulus more efficiently to the body (e.g., propagation of vibrations to the body).

Here, FIG. 8 illustrates an exemplary structure for tightening the tactile presentation device 10 on the body according to the present embodiment. As illustrated in FIG. 8, for example, in the tactile presentation device 10 to be worn on the wrist, a belt 150 is attached to press the entire casing including the tactile stimulus unit 130 against the body, whereby the tactile stimulus unit 130 can be pressed against the body by the tightening pressure of the belt 150. Note that a structure for tightening the belt 150 on the casing is not particularly limited, and as illustrated in the lower part of FIG. 8, for example, it may be a structure in which a protrusion 160 provided on the side surface of the casing is pressed by the belt 150 from above.

With this arrangement, separation of the tactile stimulus unit 130 from the body is suppressed, whereby the tactile stimulus can be easily propagated to the body.

Note that the propagation rate of the tactile stimulus to the body also changes According to a degree of tightening by the belt 150 described above. In view of the above, the control unit 120 of the tactile presentation device 10 may detect a degree of tightening by the belt 150 (i.e., degree of pressing the tactile stimulus unit 130 against the body (pressing force, contact pressure)) using a sensor, for example, and may adjust the output intensity of the tactile stimulus on the basis of the sensing result.

<4-3. Vibration Phase Matching>

Figure 9:
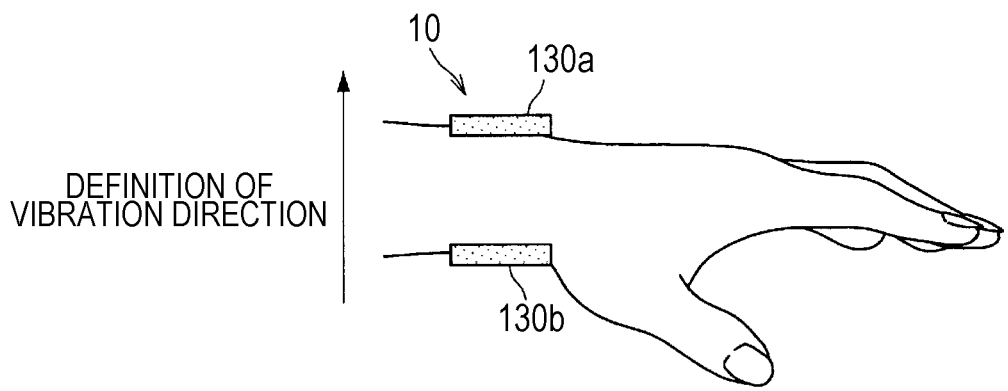
FIG. 9 is a diagram illustrating a case where the body is sandwiched by a plurality of tactile stimulus units according to the present embodiment and a tactile stimulus is presented.

Furthermore, the tactile presentation device 10 according to the present embodiment may include a plurality of tactile stimulus units 130. For example, as illustrated in FIG. 9, the tactile presentation device 10 may have a configuration in which the body is sandwiched between the plurality of tactile stimulus units 130 (130a and 130b) and a tactile stimulus (vibration) is presented (note that illustration of configurations of the belt etc. is omitted in the example illustrated in FIG. 9).

In this case, the control unit 120 of the tactile presentation device 10 can maximize the perceptual intensity by performing control to match the phases of vibrations. The vibration phase matching will be described below with reference to FIGS. 10 and 11.

Figure 10:
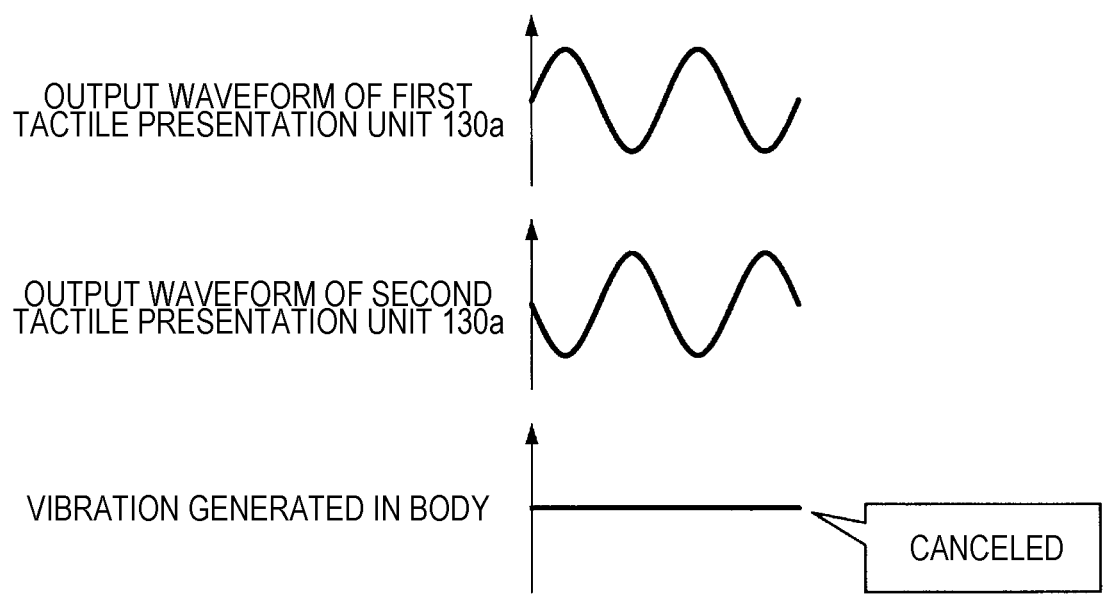
FIG. 10 is a diagram illustrating exemplary vibration phase matching in a case where the tactile presentation device according to the present embodiment includes the plurality of tactile stimulus units.
Figure 11:
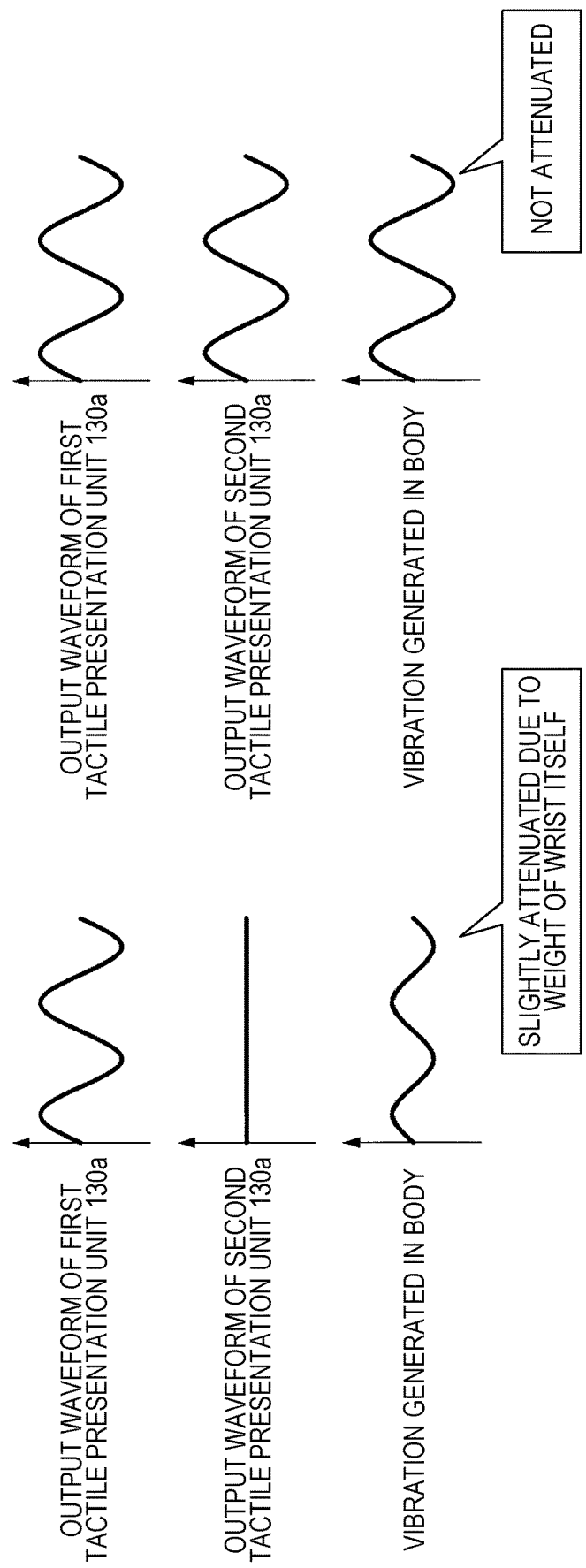
FIG. 11 is another diagram illustrating exemplary vibration phase matching in the case where the tactile presentation device according to the present embodiment includes the plurality of tactile stimulus units.

FIGS. 10 and 11 are diagrams illustrating exemplary vibration phase matching in the case where the tactile presentation device 10 according to the present embodiment includes the plurality of tactile stimulus units 130. As illustrated in FIG. 10, for example, in a case where the output waveform of the first tactile stimulus unit 130a and the output waveform of the second tactile stimulus unit 130b are opposite, vibrations to be generated in the body are canceled.

On the other hand, as illustrated in the left side of FIG. 11, for example, in a case where vibrations are output only from the first tactile stimulus unit 130a (e.g., in a case where only one tactile stimulus unit 130 is provided), it is assumed that vibrations to be generated in the body are slightly attenuated due to the weight of the wrist itself.

In view of the above, as illustrated in the right side of FIG. 11, the output waveform of the first tactile stimulus unit 130a and the output waveform of the second tactile stimulus unit 130b are matched with each other in the control u 120 according to the present embodiment, whereby attenuation of vibrations generated in the body can be suppressed and the vibration intensity can be maximized.

<4-4. Presentation Control of Tactile Stimulus According to Hand State>

Furthermore, in the case of being worn on the wrist, the tactile presentation device 10 according to the present embodiment detects state of the hand and controls presentation of the tactile stimulus according to the state of the hand, whereby the tactile stimulus as intended can be more reliably presented (vibrations are propagated).

For example, in a case where the tactile presentation device 10 worn on the wrist causes the palm or the fingertip to perceive a tactile stimulus, while vibrations propagate mainly through bones and spread as described above, if the hand is clenched into a first (closed), the density is higher than the case where the hand is opened and it is difficult to shake.

In view of the above, the tactile presentation device 10 according to the present embodiment detects a state of the hand and appropriately controls the presentation of the tactile stimulus according to the state of the hand, specifically, adjusts the magnitude of the output intensity and the frequency, whereby the presentation of the tactile stimulus can be optimized.

A method for detecting the hand state is not particularly limited, and for example, it is possible to monitor transfer characteristics that change according to the hand state and make a determination. For example, the tactile presentation device 10 may measure a resonance frequency using an acceleration sensor to determine the hand state on the basis of a result of the measurement. More specifically, since the resonance frequency becomes higher in a case where the hand is open whereas the resonance frequency becomes lower in a case where the hand is closed, the tactile presentation device 10 can determine the hand state (whether open or closed) on the basis of a change in the resonance frequency. Hereinafter, descriptions will be given with reference to FIG. 12.

Figure 12:
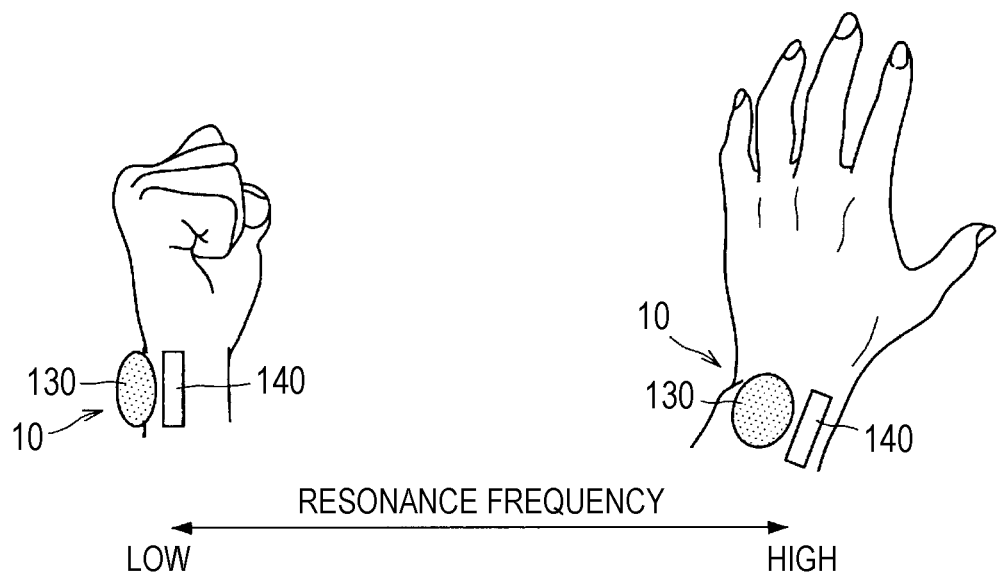
FIG. 12 is a diagram illustrating exemplary hand state detection according to the present embodiment.

FIG. 12 is a diagram illustrating exemplary hand state detection according to the present embodiment. As illustrated in FIG. 12, for example, the tactile presentation device 10 includes the tactile stimulus unit 130 and an acceleration sensor 140, and is capable of measuring a resonance frequency using the acceleration sensor 140 while generating vibrations using the tactile stimulus unit 130 and estimating the hand state by analyzing a change in the resonance frequency. Note that illustration of configurations of a belt and the like is omitted in the example illustrated in FIG. 12. Furthermore, a tactile stimulus unit (e.g., vibration actuator) separate from the tactile stimulus unit 130 may generate vibrations for measuring the resonance frequency.

For example, in a case where the target perceptual position is the fingertip, the tactile presentation device 10 outputs vibrations from the tactile stimulus unit 130 using high-frequency waves (e.g., 200 Hz or higher) as main signals to transmit the vibrations to the fingertip when the hand is open. On the other hand, since it is difficult to transmit vibrations to the fingertip when the hand is closed, vibrations may be output from the tactile stimulus unit 130 using low-frequency waves (e.g., less than 200 Hz) as main signals to present the vibrations around the contact position (wrist, etc.) of the tactile presentation device 10.

Furthermore, in a case where the hand is closed, the density is higher and it is difficult to shake as compared with the case where the hand is open, the tactile presentation device 10 may increase the vibration output intensity of the case where the hand is closed to be higher than a predetermined value.

As described above, according to the present embodiment, a vibration frequency characteristic to be presented is changed with respect to a change in vibration perception according to a hand state, whereby optimization is made possible.

Note that, since the vibration conductivity also differs depending on the size of the hand, the density (due to muscle mass, etc.), and the contact pressure of the tactile stimulus unit 130 on the body (e.g., tightening pressure of the band in the case of the wristband type as illustrated in FIG. 9), the tactile presentation device 10 can sequentially measure the resonance frequency to perform presentation control optimized for various conditions.

Furthermore, although an exemplary case where the tactile presentation device 10 worn on the wrist detects the hand state and optimizes the presentation control of the tactile stimulus has been described here, the present embodiment is not limited thereto, and it is also possible to appropriately detect a state of another body part and optimize the presentation control of the tactile stimulus in a similar manner. For example, the tactile presentation device 10 worn on the shin may be used to detect a be ding state of the knee and the posture to optimize the presentation control of the tactile stimulus, or the tactile presentation device 10 worn on the upper arm may used to detect a bending state of the arm to out the presentation control of the tactile stimulus.

<4-5. Others>

Furthermore, the tactile presentation device 10 according to the present embodiment may estimate the ease of transmission of vibrations in advance on the basis of physical characteristics such as a thickness of the wrist, and may adjust the vibration intensity and the vibration frequency on the basis of a result of the estimation. The thickness of the wrist can be detected by a sensor or the like when the band is wrapped around the arm in the case of the wristband type as illustrated in FIG. 9, for example.

Furthermore, when the remaining battery level is low, the tactile presentation device 10 may preferentially select a frequency band with lower power consumption or weaken the vibration intensity rather than the ease of transmission.

Furthermore, the tactile presentation device 10 may perform, on tactile control signals, a filtering process that absorbs the output frequency characteristic of the tactile stimulus unit 130 (e.g., vibration actuator) to select a vibration frequency or intensity that is easily transmitted as expected.

Furthermore, in a case where the heat generation of the tactile stimulus unit 130 (e.g., vibration actuator) or a battery becomes large, the tactile presentation device 10 may suppress the tactile stimulus (e.g., vibrations) to avoid a low temperature burn.

Furthermore, since the tactile presentation device 10 has the vibration conductivity on the body that differs depending on the contact pressure of the tactile stimulus unit 130 on the body e.g., due to the tightening pressure of the band in the case of the wristband type as illustrated in FIG. 9), the tactile presentation device 10 can sequentially measure the contact pressure and the degree of tightening by the belt and adjust the vibration frequency and the intensity to perform optimized presentation control as appropriate.

Furthermore, although it has been described that the frequency in a high frequency range mainly propagates through bones in the embodiment described above, the medium for the propagation of the frequency in the high frequency range is not limited to the bone, and for example, a member that easily propagates the frequency in the high frequency range may be used. This makes it possible to transmit vibrations in a wider range.

Furthermore, it is also possible to provide the tactile presentation device 10 according to the present embodiment on a floor, a chair, or the like to present a tactile stimulus to the user's body through the floor or the chair serving as a medium. In this case, the tactile presentation device 10 is enabled to control the frequency and the vibration direction according to the transfer characteristics of the medium, and to present a tactile stimulus at a predetermined perceptual position such as the contact position of the tactile presentation device 10 and a position away from the contact position.

<<5. Summary>>

As described above, in the information processing system according to the embodiment of the present disclosure, a perceptual position of a tactile stimulus can be adjusted even with one tactile stimulus unit.

As described above, although the preferred embodiments of the present disclosure have been described in detail with reference to the accompanying drawings, the present technology is not limited to such examples. It is obvious that those skilled in the art in the technical field of the present disclosure may find various alterations and modifications within the technical ideas of the appended claims, and it should be understood that such alterations and modifications are also naturally within the technical scope of the present disclosure.

For example, it is also possible to create a computer program for causing hardware such as a CPU, a ROM, and a RAM included in the information processing apparatus 20 or the tactile presentation device 10 described above to exert the functions of the information processing apparatus 20 or the tactile presentation device 10. Furthermore, a computer-readable storage medium storing the computer program is also provided.

Furthermore, the effects described in the present specification are merely illustrative or exemplary, and are not limited. That is, the technology according to the present disclosure can exert other effects obvious to those skilled in the art from the disclosure of the present specification together with or instead of the effects described above.

Note that the present technology can also employ the following configurations.

(1)

An information processing apparatus including: an output control unit that performs output control of a vibration on at least one tactile stimulus unit, in which the output control unit changes a frequency of the vibration to be output from the tactile stimulus unit depending on a position of the tactile stimulus unit and predetermined positional information.

(2)

The information processing apparatus according to (1) described above, in which the predetermined positional information includes target perceptual position on a body, and the information processing apparatus further including:

a calculation unit that calculates the frequency of the vibration to be output from the tactile stimulus unit depending on a body characteristic between a contact position of the tactile stimulus unit with a body and the target perceptual position.

(3)

The information processing apparatus according to (2) described above, in which the body characteristic includes at least vibration transfer characteristic information or perceptual characteristic information of the body.

(4)

The information processing apparatus according to (3) described above, in which the perceptual characteristic information includes information indicating a frequency range to be easily perceived at a body part.

(5)

The information processing apparatus according to (3) or (4) described above, in which the output control unit is configured to:

change the frequency of the vibration to be output from the tactile stimulus unit to a predetermined low frequency range or to a predetermined high frequency range depending on at least one of the vibration transfer characteristic information or the perceptual characteristic information between the target perceptual position and the contact position.

(6)

The information processing apparatus according to any one of (3) to described above, in which the output control unit is configured to:

change a vibration direction of the vibration to be output from the tactile stimulus unit to a horizontal direction or a perpendicular direction with respect to the body depending on at least one of the vibration transfer characteristic information or the perceptual characteristic information between the target perceptual position and the contact position.

(7)

The information processing apparatus according to any one of (2) to (6) described above, in which the output control unit is configured to:

adjust output intensity of the vibration depending on a degree of pressing of the tactile stimulus unit against the body.

(8)

The information processing apparatus according to any one of (2) to (7) described above, in which the output control unit is configured to:

change the frequency of the vibration to be output from the tactile stimulus unit depending on a state of the body.

(9)

The information processing apparatus according to (8) described above, in which the output control unit is configured to:

change the frequency of the vibration to be output from the tactile stimulus unit to a predetermined high frequency range in a case where a hand is detected to be open; and change the frequency of the vibration to be output from the tactile stimulus unit to a predetermined low frequency range in a case where the hand is detected to be closed.

(10)

The information processing apparatus according to any one of (2) to (9) described above, in which the output control unit is configured to:

perform control to match phases of the vibration to be output from a plurality of the tactile stimulus units provided with the body sandwiched between the tactile stimulus units.

(11)

The information processing apparatus according to any one of (2) to (10) described above, in which the output control unit is configured to:

perform output control of the vibration from the tactile stimulus unit along with output, control of visual information or auditory information.

(12)

A method for processing information causing a processor to perform:

controlling output a vibration on at least one tactile stimulus unit; and changing a frequency of the vibration to be output from the tactile stimulus unit depending on a position of the tactile stimulus unit and predetermined positional information.

(13)

A program for causing a computer to perform:

functioning as an output control unit that performs output control of a vibration on at least one tactile stimulus unit, in which the output control unit changes a frequency of the vibration to be output from the tactile stimulus unit depending on a position of the tactile stimulus unit and predetermined positional information.

REFERENCE SIGNS LIST

10 Tactile presentation device
110 Communication unit
120 Control unit
130 Tactile stimulus unit
140 Acceleration sensor
150 Belt
20 Information processing apparatus
200 Control unit
201 Characteristic information acquisition unit
202 Display control unit
203 Output parameter calculation unit
204 Tactile presentation control unit
210 Communication unit 220 Information input unit
230 Display
240 Storage
300 Perceived position

The invention claimed is:

1. An information processing apparatus comprising:
circuitry configured to
perform output control of a vibration on a vibration actuator, and
change a frequency of the vibration to be output from the vibration actuator depending on a contact position of the vibration actuator on a body and predetermined positional information including a target perceptual position on the body,
wherein the contact position of the vibration actuator is different from the target perceptual position on the body, and
wherein the circuitry changes the frequency of the vibration to be output from the vibration actuator in order to move the target perceptual position.

2. The information processing apparatus according to claim 1, wherein
the circuitry is further configured to calculate the frequency of the vibration to be output from the vibration actuator depending on a body characteristic between the contact position of the vibration actuator with the body and the target perceptual position.

3. The information processing apparatus according to claim 2, wherein
the body characteristic includes at least one of vibration transfer characteristic information or perceptual characteristic information of the contact position of the vibration actuator on the body.

4. The information processing apparatus according to claim 3, wherein
the perceptual characteristic information includes information indicating a frequency range to be easily perceived at the contact position of the vibration actuator on the body.

5. The information processing apparatus according to claim 3, wherein
the circuitry changes the frequency of the vibration to be output from the vibration actuator to a predetermined low frequency range or to a predetermined high frequency range depending on at least one of the vibration transfer characteristic information or the perceptual characteristic information between the target perceptual position and the contact position.

6. The information processing apparatus according to claim 3, wherein the circuitry is further configured to change a vibration direction of the vibration to be output from the vibration actuator to a horizontal direction or a perpendicular direction with respect to the body depending on at least one of the vibration transfer characteristic information or the perceptual characteristic information between the target perceptual position and the contact position.

7. The information processing apparatus according to claim 2, wherein the circuitry is further configured to adjust output intensity of the vibration depending on a degree of pressing of the vibration actuator against the body.

8. The information processing apparatus according to claim 2, wherein the circuitry changes the frequency of the vibration to be output from the vibration actuator depending on a state of the body.

9. The information processing apparatus according to claim 8, wherein the circuitry is further configured to
change the frequency of the vibration to be output from the vibration actuator to a predetermined high frequency range in a case where a hand is detected to be open, and
change the frequency of the vibration to be output from the vibration actuator to a predetermined low frequency range in a case where the hand is detected to be closed.

10. The information processing apparatus according to claim 2, wherein the circuitry is further configured to perform control to match phases of the vibration to be output from a plurality of vibration actuators provided with the body configured to be sandwiched between the plurality of vibration actuators.

11. The information processing apparatus according to claim 2, wherein the circuitry is further configured to perform output control of the vibration from the vibration actuator along with output control of visual information or auditory information.

12. A method for processing information causing a processor to perform:
controlling output of a vibration on a vibration actuator; and
changing a frequency of the vibration to be output from the vibration actuator depending on a contact position of the vibration actuator on a body and predetermined positional information including a target perceptual position on the body,
wherein the contact position of the vibration actuator is different from the target perceptual position on the body, and
wherein the frequency of the vibration to be output from the vibration actuator is changed in order to move the target perceptual position.

13. A non-transitory computer-readable storage medium having embodied thereon a program, which when executed by a computer causes the computer to execute a method, the method comprising:
controlling a vibration on a vibration actuator; and
changing a frequency of the vibration to be output from the vibration actuator depending on a contact position of the vibration actuator on a body and predetermined positional information including a target perceptual position on the body,
wherein the contact position of the vibration actuator is different from the target perceptual position on the body, and
wherein the frequency of the vibration to be output from the vibration actuator is changed in order to move the target perceptual position.

* * * * *